June 20, 1944.   E. F. FLINT ET AL   2,351,753
PHOTOGRAPHIC APPARATUS
Filed Sept. 18, 1941   4 Sheets-Sheet 1

EDWARD F. FLINT
HENRY F. KURTZ
INVENTORS

BY
ATTORNEYS

EDWARD F. FLINT
HENRY F. KURTZ
INVENTORS

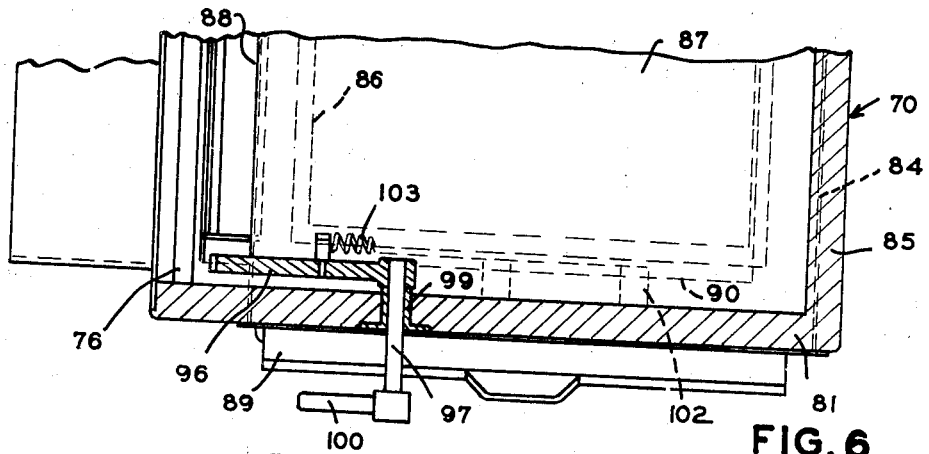
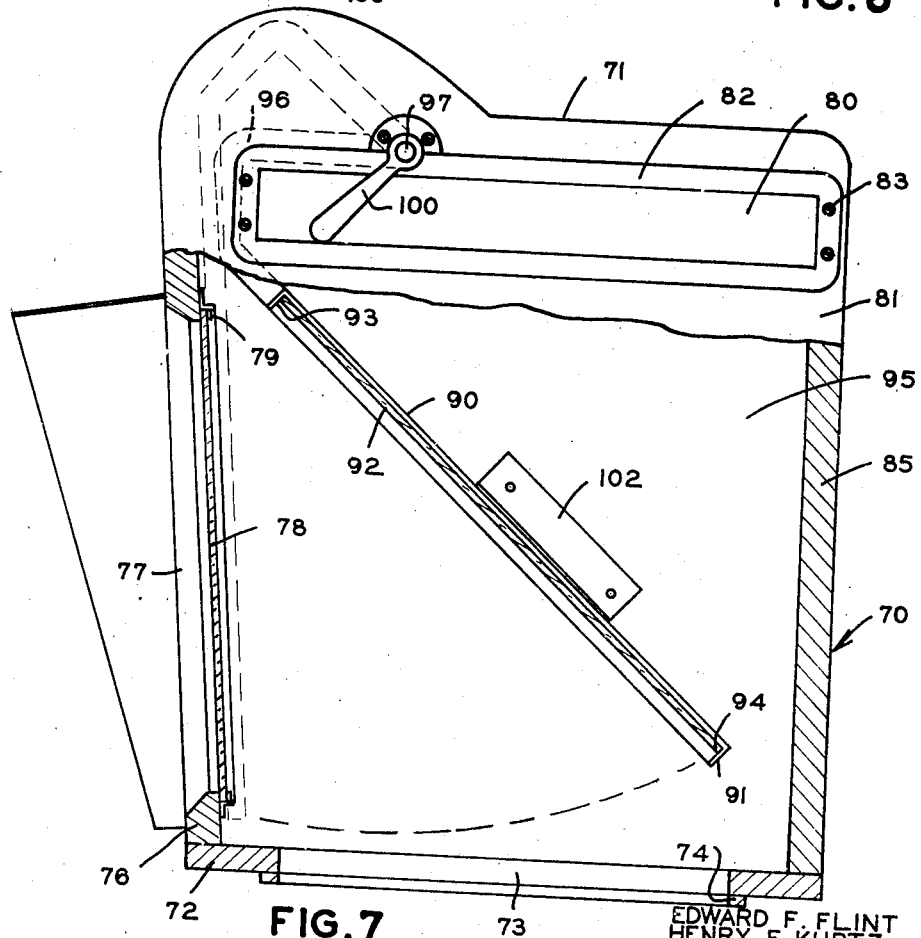

Patented June 20, 1944

2,351,753

UNITED STATES PATENT OFFICE 2,351,753

PHOTOGRAPHIC APPARATUS

Edward F. Flint and Henry F. Kurtz, Rochester, N. Y., assignors to Bausch & Lomb Optical Company, Rochester, N. Y., a corporation of New York Application September 18, 1941, Serial No. 411,360

13 Claims. (Cl. 95—42)

The invention relates to photomicrographic and projecting apparatus and more particularly has reference to a camera and mounting means therefor.

One object of the invention is to provide a novel design for a camera of the type having a housing which communicates with the camera bellows and which carries a focusing plate and a sensitized element whereby the minimum draw allowed for the bellows will equal that necessary to project the image of the object to be photographed onto the focusing plate or the sensitized element at a magnification equal to that of a magnifying lens system associated with the camera.

An equally important object is to devise means for pivotally mounting the reflector of a view finder device, which is connected to the bellows of a camera and which carries a sensitized element, whereby the reflector will swing about an axis which is located between the sensitized element and the end of the device most distant from the bellows.

Another object is the provision of a camera mounting employing a stand having a sliding bed which is movable lengthwise thereof and which is adapted to support an object to be photographed as well as various pieces of photographic equipment in desired relation to the axis of a camera which is mounted vertically about the stand.

Further objects of the invention are to provide novel slide and clamp means for adjustably supporting and for clamping the sliding bed on the stand; adjusting means for supporting the camera for movement towards and away from the object to be photographed; a constructional design permitting the stand, sliding bed and camera support to be formed of sheet material; and, in general, to provide apparatus of the nature described which may be embodied in a sturdy and rigid structure which is characterized by easy operation and efficient photographic reproduction.

With these and other objects in view which may be incident to the improvements, the invention consists in the parts and combinations to be hereinafter set forth and claimed, with the understanding that the several necessary elements comprising the invention may be varied in construction, proportion and arrangement without departing from the spirit thereof or exceeding the scope of the appended claims.

To make the invention more clearly understood, there is shown in the accompanying drawings means for carrying the same into practical effect without limiting the improvements in their useful applications to the particular constructions which, for the purpose of explanation, have been made the subject of illustration.

With reference to the drawings:

Figure 6 is a partial plan view of Figure 7 with parts broken away.

Figure 7 is a side elevation of the housing for the view finder and the sensitized element, a part of the housing being broken away.

Figures 1, 3:
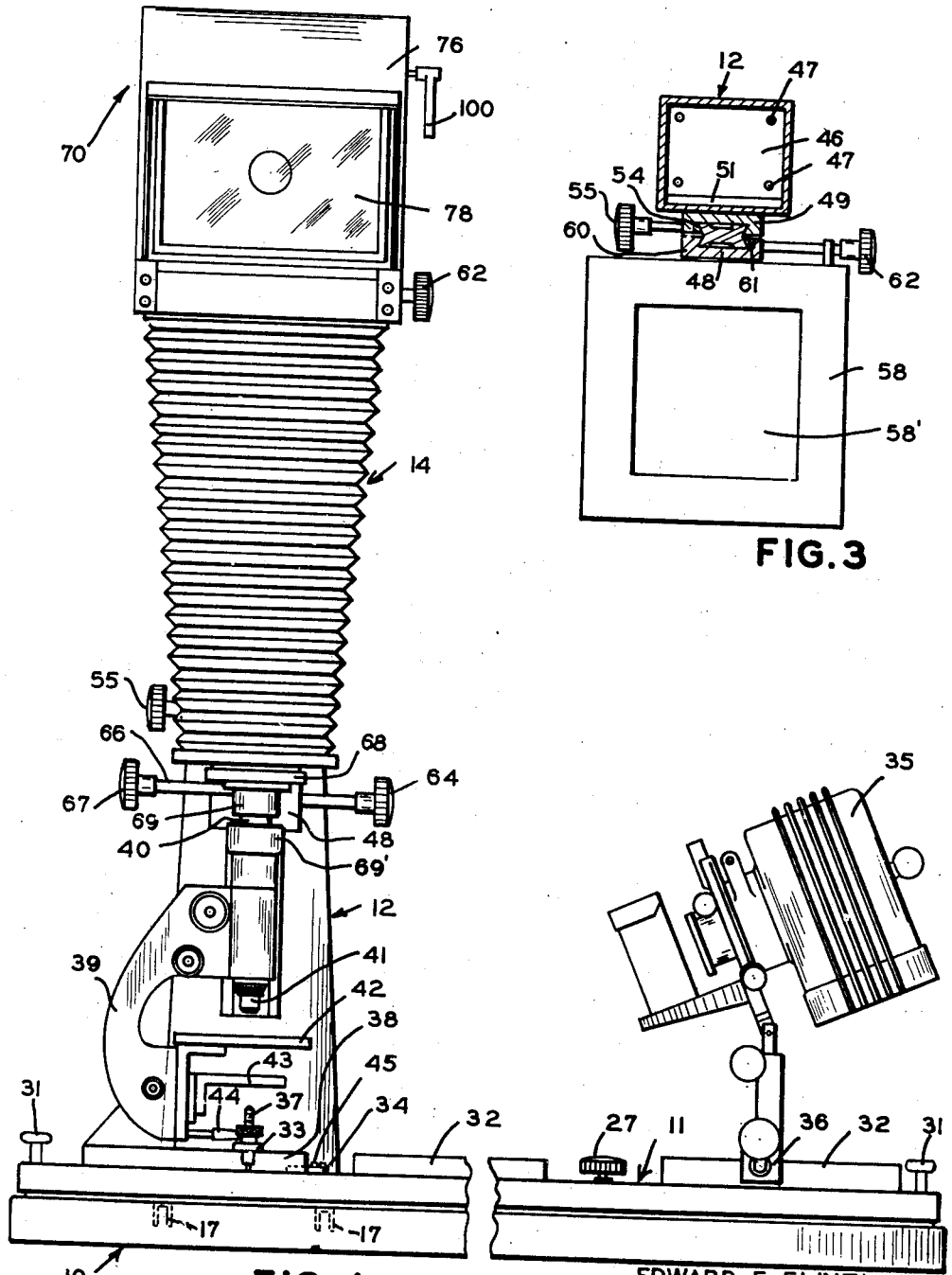
Figure 1 is a front elevation of the photomicrographic and projecting apparatus.
Figure 3 is a top plan view, partially in section, of the camera support means and shows the back board of the camera attached thereto.

Throughout the drawings, wherein like reference numerals are used to designate similar parts, there is shown a photographic apparatus which comprises a stand or base 10 having a bed 11 slidably mounted thereon for movement lengthwise thereof and also having a standard or upright 12 extending vertically therefrom at a location on the side of the bed nearest the back of the stand as viewed in Figure 1. This standard is used as a support for a camera 14 which is slidably secured thereto for vertical adjustment and which is suspended over the bed 11. The sliding bed 11 is designed to carry an object to be photographed as well as photographic equipment to the end that such may be positioned in desired relation to the optical axis of the camera 14.

Figure 2:
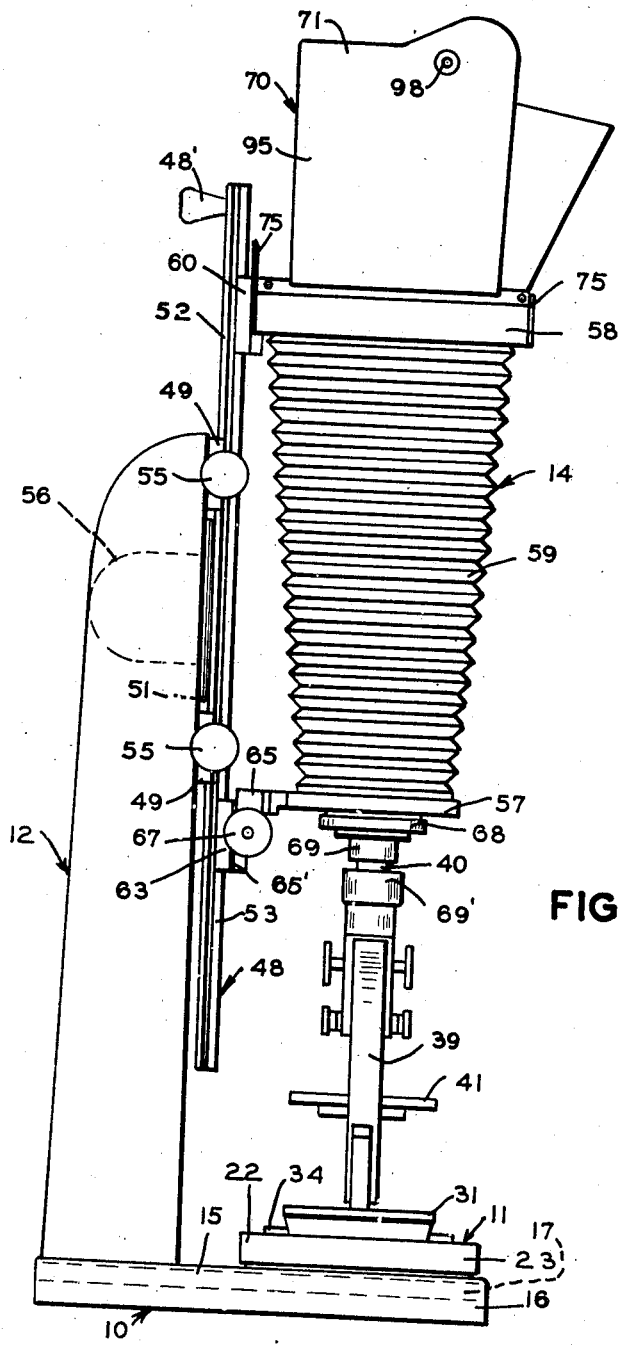
Figure 2 is an end elevation of the apparatus shown in Figure 1.
Figure 4:
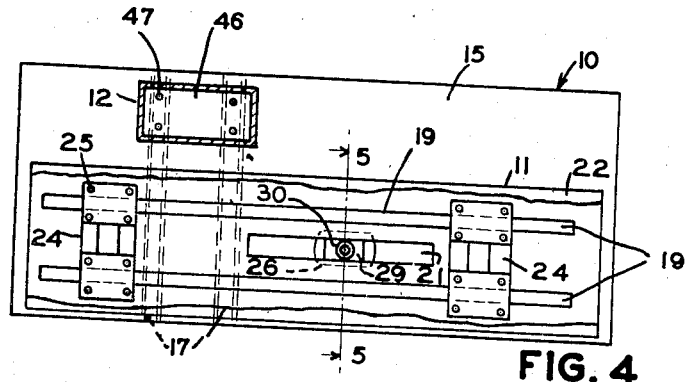
Figure 4 is a plan view of the apparatus with the camera removed therefrom and shows parts of the apparatus in section and parts thereof broken away.

Stand 10 is formed of heavy gauge sheet metal and is provided with a rectangular top or surface 15 which is adapted to be held in a substantially horizontal plane. Overturned sides and ends 16 depend from the top 15 and feet, secured to the corners of the stand, are used in supporting the stand on a table, bench or other structure. Two stiffening ribs 17 shown in dotted lines in Figures 1, 2 and 4, are welded or otherwise secured to the underside of the surface of the base 10 to extend from side to side thereof in a direction which is substantially parallel to the transverse axis of the base. Each rib 17 is in the form of a U shaped channel and together they provide stiffening means for the sheet metal stand as well as a support to which the standard 12 is secured.

A pair of spaced apart guide rods 19, attached to the surface 15 of the stand by screws or other suitable means 20, together with a slot 21, located between the guides, complete the constructional details of the stand 10. Each guide rod 19, which is preferably of a circular cross section, is of a length nearly equal to that of the stand 10 and is positioned to extend lengthwise thereof in parallel relation to its longitudinal axis. These guide means permit the bed 11 to be slidably mounted on the base of the apparatus while the slot 21 allows clamp means to extend through the base 10 to lock the bed in a desired position on its slide. Slot 21 is centered between the guides 19 in parallel relation thereto and is of a length sufficient to care for the range of adjusted positions contemplated for the sliding bed 11.

The sliding bed is also formed of heavy gauge sheet metal and is similar to the stand 10 in that it is provided with a support surface or top 22 having overturned sides and ends 23. While of a length approximately equal to that of the stand, the bed 11 is narrower being of a width sufficient to support an object and such photographic equipment and accessories as may be found desirable.

Figure 5:
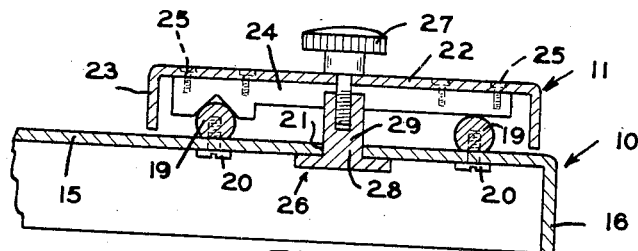
Figure 5 is a sectional elevation on the line 5—5 of Figure 4.

Means for slidably mounting the bed 11 make use of a pair of slide carriages 24 which as shown in Figures 4 and 5 are fastened to the underside of the top 22 of the bed at suitable support locations by screws or other fastenings 25. Carriages 24 are positioned so that they are substantially parallel to the transverse axis of the bed 11 and are provided at their ends with suitable slide surfaces which extend across their undersides and which seat or bear on the guide rods 19. One slide surface on each carriage 24 is in the form of a V shaped notch while the other slide surface is flat.

Each carriage 24 is located so that its notched slide surface engages the same guide rod 19 in order to retain the bed 11 on its guides. Obviously, under these conditions, it is immaterial whether or not the other guide rod 19 is exactly parallel to that engaged by the notched slide surfaces.

To assemble the apparatus, the bed 11, with carriages 24 attached thereto, is lowered onto the stand 10 to properly seat the guide carriages on their guide rods 19. Suitable cutaway portions, not shown, are formed in the right end 23 of the bed as viewed in Figure 1 to extend around the guide rods when the bed is mounted on the stand 10 and allow this end of the bed to clear the guides in its sliding movement. A cushioned stop, not shown, may be located at the end of the bed opposite to that having the cutaway portions in order to permit the bed to be stopped without appreciable jar in the centered position of Figure 1.

Clamp means for securing the sliding bed 11 in adjusted positions on the base 10 comprise a clamp nut 26 which engages a clamp screw 27. As shown in Figures 4 and 5, the nut 26 has a rounded base portion 28 which is of a greater width than the slot 21 in the stand 10. Projecting from the base 28 of the nut, in centered relation thereto, is a more or less rectangular shaped slide portion 29 which is adapted to extend through the slot 21 in sliding engagement therewith. This slide portion of the nut carries a threaded boss 30 which extends upwardly from the upper surface of the slide portion 29 of the nut 26. The clamp screw 27 is suitably supported on the longitudinal axis of the sliding bed 11 in the manner shown in the drawings with its shank extending through the top of the bed and engaged with the nut 26.

As the slide portion 29 of the clamp nut will prevent its rotation on the clamp screw, it will be apparent that suitable actuation of the latter will draw the upper surface of the base 28 of the clamp nut into clamping contact with the underside of the top 15 of the stand 10. Location of the clamp on the longitudinal axis of the bed 11 permits it to apply a force at each of the slide surfaces of the carriages 24 which is directed diagonally of the bed 11. These forces are sufficient to pull each slide surface of a carriage 24 into contact with its guide rod 19 due to the use of sheet metal to form the bed 11 so that the latter is locked in positive contact with the guide rods at four locations, each near an end of the bed. Obviously, when the clamp means are in a released condition, the base 28 of the clamp nut is out of contact with the stand 10 so that the sliding bed 11 may be moved along its guide rods 19 to a desired position at which latter it may be secured by merely tightening the clamp means.

Actuation of the clamp means will develop equal forces at each carriage 24 when the clamp screw 27 is located midway between each carriage. For convenience in mounting photographic equipment on the bed 11, it is desirable to position the clamp screw 27 to one side of the center thereof. While this practice causes the forces developed at one carriage to be greater than at the other carriage, it has nevertheless been found that forces of this character are adequate to draw the bed into proper locking contact near each of its four corners.

The importance of the sheet metal construction for the bed 11 and the design of its clamp means will be apparent when it is considered that photomicrograpic work is frequently conducted with a camera having a lens system which is mounted separately from the camera in a position in front of and in alignment with the camera bellows. It is essential in carrying out photographic reproduction of this character that such a lens system and the camera be held in relatively fixed alignment. Hence it is desirable that the support for the lens system and also that for the camera be tied together to prevent their independent vibration as the result of some jar received by either or both supports. The foregoing desideratum is attained by the invention herein disclosed since any lens system, as for one example that of the microscope shown in Figure 1, which is mounted on the bed 11 may be relatively fixed with respect to the stand 10, due to the four cornered contact of the bed with the stand while the camera 14 is similarly fixed to the stand due to its mounting on the upright 12 secured to the stand.

Other details of the sliding bed 11 include handles 31 mounted at the ends thereof to facilitate its adjustment on the stand 10, two guide blocks 32, two clamp members 33 and a slidable aligning plate 34, all of these parts being supported on the top 22 of the bed. The guide blocks 32 are located on opposite sides of the clamp screw 27 to extend lengthwise of the bed 11 and are suitably secured thereto in centered relation to its longitudinal axis. Normally, the guide locks 32 function as an optical bench to support various photographic equipment and accessories for adjustable sliding movement lengthwise of the bed. To illustrate this function, a projection lamp 35 is shown as mounted in adjusted position upon one of the guide blocks 32. Lamp 35 is supported, by any conventional means, upon a suitable slide member 36 which is slidably engaged with the block 32 for adjustment thereon in the manner disclosed.

While only a lamp 35 has been shown as mounted on the guide blocks 32, it is to be noted that the guide blocks are designed to simultaneously support other equipment and accessories. For example, the guide blocks 32 may have engaged thereto for adjustment thereon an object support or stage, various optical elements such as different lens systems, reflectors and filters as well as several light sources of different types and the invention comprehends the mounting of any combination of the equipment and accessories just mentioned. Another function of the guide blocks 32, as will more fully appear, is to permit the camera 14 to be adjustably supported thereon instead of on the upright 12.

Clamp members 33 and the aligning plate 34 heretofore described as mounted upon the bed 11 are employed for removably securing a microscope on the bed. Each clamp member 33 is adjustable on an upright post 37 which is provided with a threaded end engaged by a suitable clamp nut. Posts 37 are suitably mounted on the bed 11 and are positioned on opposite sides thereof to permit their clamp members 33 to engage the top of the base or foot 38 of a microscope which may comprise the usual pivoted arm 39 adapted to support a suitable eyepiece 40, one or more objectives 41 as well as stage 42, condenser holder 43 and mirror 44.

Aligning plate 34 is of L shape with its long leg extending in substantially parallel relation to the transverse axis of the bed 11 so that its short leg is engageable with a side of the microscope foot as shown by the dotted lines in Figure 1. Screws 45 which extend through the long leg of the plate 34 and which are engaged with the bed 11 are employed for adjustably securing the aligning plate member to the bed for transverse movement thereof.

To mount the microscope, it is seated on the bed 11 with the toes of its foot 38 in contact with the plate 34 after which it is properly aligned with the camera by longitudinal movement of the bed on its guides 19 and adjusting movement of the microscope itself on the bed in a transverse direction thereof while maintaining the toes of the foot 38 in contact with the plate 34. The microscope is then fixedly secured to the bed by the clamp members 33 and by securing the plate 34 in a position wherein its short leg is in firm contact with the foot 38. Obviously, the microscope may be held in its aligned position by securing the bed 11 to its stand 10. It is to be noted that the plate 34, when secured in adjusted position, provides means for permitting the microscope to be reseated in centered relation to the camera along an axis which is transverse of the bed 11.

The standard or upright 12 which is adapted to support the camera 14, like the stand 10 and sliding bed 11, is formed of heavy gauge sheet metal. Two pieces of sheeting are employed for this purpose, the larger one of which is shaped to form the front and sides of the standard while the smaller forms the back thereof. These pieces of sheeting are suitably welded or otherwise secured together to provide the upright of the form disclosed in the drawings, which as may be noted has a generally rectangular cross section.

A mounting plate 46 is secured within the lower end of the standard 12, that is to say, the end of the upright adjacent the stand 10. Plate 46 has a substantially flat lower surface and is carefully mounted within the upright 12 so that this surface is substantially normal to the longitudinal axis thereof and is flush with the lower end of the upright. This mounting plate 46, which is welded to the walls of the standard, provides means whereby the standard may be mounted on the base 10 so that it is substantially normal to the surface of the base. To this end, screws 47 extend upwardly through the U shaped stiffening ribs 17 and top of the stand 10, which latter also has a reasonably flat surface, to engage suitably threaded holes in the plate 46 and draw the plate and the standard to which it is attached into firm bearing contact with the stand 10.

In mounting the camera 14 on the standard 12, use is made of a support member 48 which is adjustable longitudinally of the standard, that is to say, in a substantially vertical direction, and which has the camera mounted thereon for independent adjustment in a similar direction. The support member 48 is adjustably carried in upper and lower guide brackets 49 which are positioned in suitable alignment with each other and which are secured to the outer surface of the front of the standard by suitable screws adapted to extend therethrough and to engage a bearing plate 51, the latter being welded or otherwise secured to the inner surface of the front of the standard prior to the assembly of the latter.

Support member 48 is of sufficient length to allow desired adjustments of the camera 14 and has one face 52 provided with a dovetail slide surface which is adjustably engaged within the guide brackets 49 while it has its opposite face 53 provided with a dovetail guide surface adapted to have the front and back boards of the camera slidably mounted thereon. Both surfaces 52 and 53 extend from end to end of the support member 48 which is secured in a desired position by conventional clamp means associated with each bracket 49. Each of the clamp devices for this purpose comprise an adjustable gib 54 which is mounted within each bracket 49 and which is moved into and out of clamping engagement with the support member 48 by means of a clamp screw 55 carried by each bracket.

A suitable counter balance mechanism 56, indicated by the dotted lines in Figure 2, is preferably mounted within the standard 12 for attachment in the usual manner to the support member 48 so as to hold the support member and camera mounted thereon in an elevated position when both clamp screws 55 are turned to release the clamp means which secures the support member to the standard 12. To assist in positioning the support member 48 in its guide brackets, a handle 48' may be secured at the upper end of the support member.

The camera 14 has the usual front board 57, and back board 58 which support a conventional bellows 59 between them, one end of the bellows being secured to the front board and its opposite end being secured to the back board. Both boards are provided with suitable light openings, that in the back board being indicated at 58' in Figure 3, which are supported in alignment with each other and which are adapted to be aligned with a lens system associated with the camera. Back board 58 has a slide bracket 60, similar to a guide bracket 49, secured to its edge nearest the upright 12 by screws or other suitable fastenings. The bracket 60 is slidably engaged with the guide surface 53 on the support member 48 and is clamped in desired positions by clamp means similar to those employed for securing the support member to a guide bracket 49 in that the clamp means comprise an adjustable gib 61 actuated by a clamp screw 62.

Slidable means engaged with the support member 48 are also employed for adjustably mounting the front board 57. These means employ a slide bracket 63 which is slidable on the guide surface 53 of the support member 48 and which is adjustably clamped to the latter by a clamp screw 64 adapted to actuate a clamp gib, not shown, in a manner like that heretofore described. The face of the bracket 63 which is opposite to its slide surface is provided with an auxiliary guide surface 65' on which latter an auxiliary slide 65 is slidably mounted, the auxiliary slide 65 being fixed to the back edge of the front board 57 by some fastening means such as screws or the like. A conventional rack and pinion construction, not illustrated in detail but actuated by the pinion shaft 66 on the proper rotation of its operating button 67, is employed to move the auxiliary slide 65 in a desired direction relative to the slide bracket 63.

The just described construction permits the camera 14 to be moved as a unit relative to the standard 12 in a direction towards or away from the sliding bed 11 while it also permits the boards 57 and 58 to be moved relative to the support member 48 in a direction towards or away from the bed 11. Further, by reason of this construction, the front and back boards are independently movable of each other and are also independently movable of the support member itself.

In general, movement of the camera as a unit is employed to adjust its working position so that the front of the camera may be located at that elevation above the object which is most suitable to carrying out the adjustment of the camera boards for photographing or copying the object. From this it will be apparent that the independent adjustment of the boards 57 and 58 will generally be used to set the magnification at which the object will be reproduced and that the auxiliary movement of the front board 57 on actuation of the button 67 will be employed to finely focus the image of the object. The practice just outlined for operating the camera has been indicated as general in its nature and is not to be taken in limitation of the invention. Obviously varied combinations of the steps mentioned may be adopted and in fact other procedure may be employed in setting the camera for working position and magnification.

The front board 57, which is provided with the usual light opening therethrough, has a suitable shutter mechanism 68 fixed to its front surface in alignment with the light opening. Shutter mechanism 68 is provided with a conventional seat into which there may be screwed or otherwise removably secured either a lens mount, not shown, for a camera lens or a light-tight coupler 69 when the camera is used with a microscope. In this latter instance, the microscope eyepiece and objective serve as the lens system for the camera. The body tube of the microscope may be provided with a flange 69' which acts as a light coupler adapted to cooperate with the coupler 69 to provide a suitable light trap between the microscope and the camera. While the camera and microscope are shown in alignment, the couplers 69 and 69' are shown in separated position in order to clearly illustrate this connection means.

It is highly desirable in photographic apparatus which employs a magnifying lens system to be able to reproduce the object at any magnification within a range having a minimum limit equal to the magnification of the lens system associated with the camera and a maximum limit equal to two and a half or more times this minimum magnification. Since the camera of such apparatus is used in a vertical position, it is also desirable to provide means for viewing an image of the object in a plane which is parallel or slightly inclined to the vertical axis of the camera.

An adjustable magnification range can be obtained by the use of a bellows designed to permit the distance between the magnifying lens system used with the camera and the sensitized element on which the reproduction is made to be varied at will within the limits of the range. Also, by use of a reflector which is positioned across the optical axis of the camera and is angularly disposed thereto, it is possible to form an image of the object to be photographed on a focusing plate which is located in a plane slightly inclined or parallel to the camera axis. These constructional expedients suggest that both of their advantages may be simultaneously attained through the use of a camera of the so-called "reflex" type, that is to say, a camera wherein light transmitted through its lens system is directed at will to form an image of the object to be photographed either on a sensitized element or a focusing plate.

A serious disadvantage to the employment of a reflex camera is presented in the lack of a practical construction wherein the reflector means used therewith may be mounted to permit the minimum bellows draw needed for reproduction at a magnification equal to that of the magnifying lens system used with the camera. The magnification for a lens system which forms a virtual image may be determined by the size of the image at the distance of best vision from the lens system, which distance is usually considered as ten inches and which when divided by the focal length of the system will give the magnification rating thereof.

From this it follows that an image projected by a system of this character will, in an image plane at the distance of best vision from the system, appear at the same size as the virtual image. Hence, to obtain such magnification it is necessary to have a minimum bellows draw which will equal the distance of best vision, bellows draw being defined as the distance which the bellows allows the back focal plane of the lens system to be separated from the plane of the working surface of the sensitized element.

Figure 8:
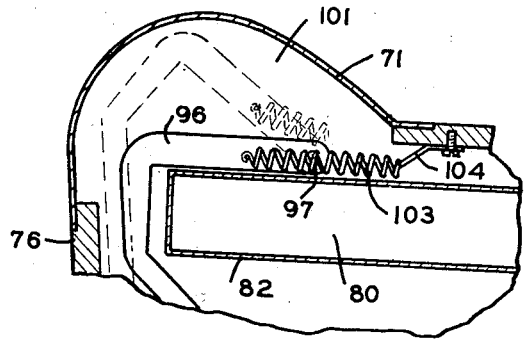
Figure 8 is a fragmentary side elevation of the housing similar to Figure 7 but with a different part of the housing broken away.

A construction for overcoming this difficulty is shown in Figures 6, 7 and 8 wherein use is made of a box like structure 70 adapted to house view finding means, support means for a sensitized element and pivotally mounted reflecting means. The housing 70 comprises four side walls, a closed end 71 and an open end 72, the latter having a centrally located passageway 73 extending therethrough. A flange 74, located on the end 72 of the housing to surround the opening 73, is adapted to be engaged with the light opening in the back board 58. This construction permits the housing 70 to be seated on the back board of the camera so that the openings in these two members are aligned with each other and consequently align the housing with the optical axis of the camera. Conventional fastening means 75 are employed to releasably secure the housing 70 to the back board 58.

One side wall 76 of the housing 70 is provided with a cutaway or window portion 77 which is covered by a ground glass focusing plate 78 carried by a mounting frame 79 adapted to be secured to the inside of the wall 76 in any suitable manner. Window 77 is surrounded by the usual hood to aid in viewing the image on plate 78 which latter is centered with respect to the window. Dimensions of window 77 in the plane of the focusing plate are substantially equal to those of the photograph taken by the apparatus. In this connection, the transverse dimensions of the housing 70 are selected so that the focusing plate may be located with respect to the reflector means as well as with respect to the camera axis in such manner that the object to be photographed can be imaged on the focusing plate at the same magnification as it will be imaged on the sensitized element mounted within the housing. In other words, the optical distance from the lens system to the focusing plate will equal that from the lens system to the sensitized element carried in the housing.

A rectangular opening 80 is cut in the side wall 81 so that the longitudinal axis of the opening is substantially parallel to the open end of the housing and is normal to the axis of the camera. Opening 80 permits a rectangular box 82 to be mounted within the housing 70 to extend from the side 81 to the directly opposite side 95 of the housing and provides a support in which a holder for a sensitized element may be removably mounted. The end of the box 82 at the side wall 81 may be formed with a suitable flange which contacts the outer surface of the wall when the box is mounted within the housing and which is secured thereto by screws 83. A channel or guideway 84 is formed in the side wall 85, which wall is directly opposite to wall 76 which carries the focusing plate 78. Channel 84 is adapted to engage the top and bottom of the box 82 along the side thereof to assist in supporting it within the housing.

The bottom of the box 82 is provided with a centrally located light opening 86 over which a sensitized element 87 in the form of a photosensitized plate or film pack is supported. Sensitized element 87 is carried in the usual type of plate or film holder 88 which is slidable within the box 82 and is removably held therein by a conventional spring construction which retains it in alignment with the opening 86. In keeping with its conventional construction, holder 88 is provided with the usual dark slide 89 employed in the usual manner to expose the sensitized element to the action of light.

The box 82 is mounted within the housing 70 so that its light opening 86 is aligned with the center of the open end 72 of the housing and so that the surface in which the light opening is formed lies in a plane which is parallel to that end of the housing. In this manner, the light opening 86 is aligned with the optical axis of the camera. Location of box 82 with respect to the ends of the housing 70 is chosen so that the sensitized element 87 will be supported in an image plane which is separated from a magnifying lens system used with the camera by the distance of best vision when the object is to be reproduced at the magnification of such system. The width and breadth dimensions of the sensitized element 87 are arbitrarily chosen to provide an image field of a size most convenient for the uses of the camera. For general all around purposes, a sensitized element which will produce a five inch by seven inch photograph has been found highly satisfactory.

The reflecting means mounted within the housing 70 are adapted to assume two working positions, each one of which serves a different purpose. When such means are in one position, they function to direct the image forming light rays which pass through the camera bellows 59 and which normally strike the sensitized element 87, onto the focusing plate 78 while screening the sensitized element from the action of light. In the second working position, the reflecting means act as a light-tight cover for the focusing plate 78 while permitting light rays after passing through the camera bellows to continue their normal course to strike the sensitized element.

The particular reflecting means employed are detailed in Figures 6, 7 and 8 and comprise the reflector frame 90 provided with a base portion, generally of rectangular shape, having a surrounding flange 91 which projects therefrom substantially at a right angle and which retains a reflector 92, also generally of rectangular outline, in seated position on the base portion of the frame. For focusing purposes, the reflector 92 is located to have its edges 93 and 94 substantially normal to the parallel side walls 81 and 95 with its edge 93 positioned adjacent the edge of the focusing window nearest the closed end 71 of the housing and the reflector itself positioned in a plane inclined to the focusing window and extending from the focusing window across the housing towards the open end thereof to cover the light opening 73. In its other working position, reflector 92 is located so that its reflecting surface is parallel to and covers the focusing plate 78 and its flange 91 engages the window frame 79 to effect a light-tight closure therebetween.

Obviously, a simple manner of moving the reflector 92 between working positions is to support it so that its edge 93 may be pivoted about an axis which is normal to the sides 81 and 95 of the housing and which is located adjacent the focusing window and between the latter and the box 82. Since such an expedient is the equivalent of pivoting the long leg of a triangle, namely, the reflector 92, to the end of one of its short legs, namely, the focusing plate 78, it will be apparent when the reflector is made parallel to the focusing plate that it will extend beyond the housing. This condition can be accommodated by lengthening the sides of the housing but with an attendant increase of the distance between the support box 82 for the sensitized element 87 and the end 72 of the housing. Any lengthening of the housing in this manner will increase the bellows draw by a like amount and consequently will prevent a minimum bellows draw capable of producing an image on the sensitized element at the magnification of a magnifying system used with the camera.

This difficulty may be overcome and the distance between the sensitized element and the open end of the housing kept at the desired minimum if the pivoting action of the reflector 92 is accompanied by its bodily movement towards and away from the closed end 71 of the housing. To permit practice of this nature, the reflector 92 is supported between the ends of a pair of pivot arms 96 which are pivoted on an axis located between the top of the box 82 and the closed end 71 of the housing and which extend from their pivot along the top of the box and around its edge adjacent to the focusing plate 78. One end of each pivot arm 96 is fixed to one of a pair of pivot shafts 97 and 98 which are journalled in separate bearings 99 located between the top of the box 82 and the closed end 71 of the housing. Bearings 99 extend through the parallel side walls 81 and 95 and have a common axis which is normal thereto and which lies in a plane parallel to the open end 72 of the housing. The unpivoted end of each arm 96 is screwed or otherwise fastened to an edge of the reflector 90 so as to support the same between them for movement about their pivot axis.

In addition to being shaped so that they partially extend around the box 82, pivot arms 96 are formed to permit the reflector 92 to be held, when in focusing position, at a desired angle with the open end of the housing. This position for the reflector is shown in full lines in Figure 7 and it will be apparent that light rays entering the housing 70 from the bellows 59 will be prevented from reaching the sensitized element 87 due to their interception by the reflector 92 and their redirection onto the focusing plate 78. The angle of the reflector with the open end of the housing, when operating for focusing, is made slightly less than 45° to conveniently accommodate the displacement of the pivot arms and, by way of compensation, the focusing plate 78 is suitably inclined to the camera axis so that the image may be properly formed thereon.

With the reflector in focusing position, it is to be noted that the distance along the camera axis from the open end 72 of the housing to the sensitized element 87 is equal to the distance on the camera axis to the reflector plus the distance from the reflector to the focusing plate 78 along an axis normal to the camera axis at the point where the latter intersects the reflector. Under these conditions, an object may be imaged on the sensitized element 87 and on the focusing plate 78 at the same magnification.

Pivot shaft 97 extends beyond the side wall 81 and is provided with an actuating lever 100 suitably fixed thereto. Movement of the lever 100 in clockwise direction as viewed in Figure 7 will cause the edge of the reflector frame 90 nearest the open end of the housing to swing about its pivot axis as a center and to move along the dotted line arc towards the focusing plate. Occurring with this arcuate movement, is a bodily shifting of the reflector frame 90 towards the closed end 71 of the housing. Movement of this character continues until the reflector frame 90 and pivot arms 96 assume the dotted line position of Figure 7 wherein the flange 91 of the reflector frame engages three sides of the focusing plate frame 79 in a light-tight connection, the reflector 92 entirely covers the focusing plate and extends beyond it and the L shaped portion of each pivot arm 96 is located entirely above the top of the box 82.

To provide freedom of movement for the pivot arms 96, it is necessary to form a suitable clearance chamber on the closed end 71 of the housing. The walls and ends of the housing may be formed of any suitable material such as wood, plastic or metal. In the construction disclosed, a portion of the end 72 of the housing is formed of sheet material which is suitably rounded and attached to the housing in the manner shown in Figure 8 so as to provide the clearance chamber 101.

When the reflector 92 is in its position to cover the focusing plate, it will be apparent that light rays which pass through the bellows may proceed without interruption to the sensitized element 87 carried in the box 82. Rotation of the lever 100 in a counterclock direction, as viewed in Figure 7, will obviously return the reflector frame to its full line position. Limitation of this movement is provided by suitable stops 102 secured to the parallel side walls 81 and 95. When the reflector is in focusing position, it should be noted that lever 100 extends across the opening 80 and prevents removal of the dark slide 89 from the sensitized element. This expedient is designed to avoid accidental exposure of the sensitized element should the front end of the bellows be open to the passage of light therethrough when the reflector 92 is pivoted to close off the focusing plate from the housing.

A pair of springs 103, one for each pivot arm, is employed to urge the reflector frame 90 against its stop 102 when in its focusing position and against the frame 79 when the reflector is positioned to cover the focusing plate. Each spring has one end connected to the inner side of its respective pivot arm 96 at a point thereon which will lie over the top of the box and its other end secured to a separate bracket 104 secured to the closed end of the housing. Brackets 104 are so located that each spring will extend across the pivot axis of the arms 96 and will be off centered with respect to such axis when the reflector is in either of its working positions. As shown in Figure 8, when a spring 103 is off centered between the pivot axis of the reflector and the top of the box 82, it will urge the reflector frame 90 against its stop 102 while when the spring lies between such axis and the closed end of the housing, it will urge the pivot arms and reflector frame to the dotted line position shown.

In considering the operation of the apparatus, the ability of the bed 11 to be moved transversely of the camera axis should be kept in mind. This feature greatly facilitates the mounting and adjustment of equipment to be used with the camera as it permits the bed to be moved to convenient locations where the equipment may be mounted and adjusted without interference from the camera. As one example, after a microscope has been properly mounted on the bed, the camera may be raised and the bed moved to one side thereof to permit suitable adjustment of the lamp 35 and the microscope as well as any other equipment to obtain critical illumination for the microscopical object.

Following adjustment of equipment, the bed 11 is moved in the opposite direction until the microscope and the equipment on the bed are suitably aligned with respect to the camera axis and the camera is then lowered to its working position by actuation of the camera support 43 and clamp screws 55.

Upon opening the shutter mechanism 68, the bellows draw may now be set to give the desired magnification for the reproduction by suitable adjustment of the front and back boards of the camera after which the camera is focused through the use of the focusing slide 65 on the front board 57. During these operations, it is to be noted that the image on the focusing plate will appear at a magnification which will equal that at which the object will be photographed, it being assumed that the reflector 92 is in its focusing position. Should it be found desirable to move the camera after it has been focused, it is to be observed that it may be moved as a unit either to or from its working position without effect upon the magnification setting. A plate or film having been mounted in the box 82 and the shutter 68 having been closed, lever 100 can be actuated to position the reflector 92 to cover the focusing plate 78 and the shutter mechanism can now be operated to make the desired exposure.

Obviously, types of microscopes other than that shown may be used with the invention. As another type of instrument, it is pointed out that extremely efficient results can be obtained when using a comparison microscope with the apparatus.

It will, however, be understood that the invention is not limited solely to use with a microscope. In fact, a general purpose apparatus, having many uses, has been provided. For example, the apparatus is especially adaptable to low power photomicrography on equipping the camera with a suitable photographic lens, which is carried from the shutter 68 in place of the light-tight coupler 69, and by mounting an object stage and condenser on the optical bench 32. Low power photomicrography, and indeed high power work as well, may be carried out with incident or transmitted light or both through the use of one or more light sources and reflectors which may be adjustably supported on the optical bench. The particular construction of the optical bench permits the arrangement of the equipment so that either critical or Koehler illumination may be readily attained.

Other important uses of the apparatus when a suitable lens is mounted in the camera include its employment as a photographic enlarger and printer. Another use is found in the ability of the apparatus to provide a copy camera. In this latter instance, where large objects such as maps, charts, X-rays and the like are to be reduced, the camera may be set up on the optical bench 32. When so mounted the camera axis will be horizontal instead of vertical as shown. Such an arrangement is effected by the removal of the camera from its vertical support member 48 and the engagement of its guide brackets 49 with the optical bench 32.

From the foregoing, it will be realized that the aims and objects of the invention have been attained, in that the apparatus disclosed provides sturdy and easily operated means for efficiently making photographic reproductions. This has been made possible by the sliding bed, camera support, view finding means and the other construction details disclosed which all work to the common end of providing photographic apparatus susceptible to a wide variety of uses.

We claim:

1. In a camera, the combination of a lens system and a housing, said housing having an open end operatively connected to and aligned with said lens system, mounting means within said housing for holding a sensitized element between the ends of the housing and in alignment with said lens system, a focusing plate mounted in a side of said housing, a reflector within said housing, support means having one end connected to said reflector, and fixed means for pivotally mounting the opposite end of said support means for movement about an axis located between said mounting means and the closed end of the housing, said reflector being movable from a position wherein it is substantially parallel to said plate to a position wherein it extends across the optical axis of said lens system and is angularly disposed to said optical axis and also to said plate.

2. In a camera, the combination of a lens system and a housing having a closed end and an open end, the open end of said housing being operatively aligned with said lens system and operatively connected thereto, mounting means within said housing for holding a sensitized element between the ends of the housing and in alignment with the lens system, a focusing plate mounted in a side of the housing, a reflector within said housing, and support means having one end connected to said reflector, the opposite end of said support means extending partially around said mounting means, means for pivotally mounting the last-named end of said support means for movement about an axis located between said mounting means and the closed end of the housing whereby said reflector may be moved from a position wherein it is substantially parallel to said plate to a position wherein it extends across said plate to the optical axis of said lens system and is angularly disposed to said optical axis and also to said plate.

3. In a camera of the type described, a lens system; a bellows with one end thereof connected to said lens system; a housing connected to the opposite end of said bellows whereby the housing is aligned with the lens sytem; mounting means within said housing for holding a sensitized element in alignment with said lens system, said element being held in a plane substantially normal to the optical axis of said lens system and disposed between the ends of said housing; a focusing plate mounted in a side of said housing; a reflector within said housing; support means having one end fixed to said reflector, the opposite end of said support means extending partially around said mounting means; and means for pivotally connecting the last-named end of said support means for pivotal movement about an axis which is substantially normal to said optical axis and which is postioned between said mounting means and the end of the housing most distant from said bellows, said reflector being pivotally movable from the position wherein its reflecting surface is substantially parallel to said plate and wherein it provides a substantially light-tight cover for said plate to a position wherein its reflecting surface is angularly disposed to said plate and extends across said optical axis at an angle thereto.

4. In a camera of the type described, a lens system; a housing having an open end operatively connected to and aligned with said lens system; means for holding a sensitized element adjacent the closed end of said housing and in alignment with the lens system; a focusing plate mounted in a side wall of said housing; a pivotal support disposed between said holding means and the closed end of said housing; a reflector; means for connecting said reflector to said pivotal support whereby said reflector pivotally moves about the axis thereof between operative and inoperative positions within said housing; and means on said reflector for housing said plate when said reflector is moved to its inoperative position, said reflector in the operative position extending across the optical axis at an angle to project on said plate the image formed by said lens system.

5. In a camera of the type described, a lens system; a housing having an open end and a closed end aligned with said lens system and operatively connected thereto; means within said housing for holding a sensitized element adjacent the closed end of the housing in alignment with said lens system; a focusing plate mounted in a side of said housing; a reflector; means for supporting said reflector within said housing; means having a fixed pivotal axis disposed between said closed end and said holding means for mounting said supporting means whereby said reflector may swing about said fixed axis from a position wherein it substantially covers said plate and lies outside of a pencil of light directed by said lens system toward said holding means to a working position wherein it extends across the optical axis of the lens system to intercept and reflect said pencil onto the said plate; and a single resilient means disposed between said holding means and the closed end of said housing interconnecting said pivotal mounting means and said housing for releasably holding the reflector in either position.

6. A camera comprising a lens system; a housing mounted in optical alignment with said lens system; a focusing plate carried by a wall of said housing; means for holding a sensitized element in close proximity to a wall adjacent to said plate; rotatable means mounted for movement about a fixed axis intermediate said holding means and said last-named wall, said axis being displaced inwardly of the wall carrying said plate; a reflector; means for connecting said reflector to said rotatable means for pivotal movement between alternate positions relative to said housing, said reflector in one of said positions angularly extending across the optical axis of said lens system whereby an image formed by said system is reflected onto said plate, in the other of its positions said reflector lying substantially parallel to said plate and forming a light-proof cover therefor.

7. A camera comprising a lens system; a housing mounted in optical alignment with said system; a focusing plate in a wall of said housing; means for holding a sensitized element in close proximity to a wall adjacent to said plate; rotatable means mounted for movement about a fixed axis intermediate said holding means and said last-named wall; a reflector; carrier means for said reflector, said carrier means extending beyond a margin of said reflector and terminating in a reversely bent end; and means for connecting said end to said rotatable means whereby said reflector pivotally moves about the fixed axis of said rotatable means.

8. A camera comprising a lens system; a housing mounted in optical alignment with said system; a focusing plate in a wall of said housing; means for holding a sensitized element in close proximity to a wall adjacent to said plate; rotatable means mounted for movement about a fixed axis intermediate said holding means and said last-named wall; a reflector; carrier means for said reflector, said carrier means extending beyond a margin of said reflector and terminating in a reversely bent end; and means for connecting said end to said rotatable means whereby said reflector pivotally moves about the fixed axis of said rotatable means; and means for moving said rotatable means, said means comprising an operating member carried exteriorly of said housing, the relative position of said member indicating the position of said reflector relative to said housing.

9. A camera comprising a lens system; a housing mounted in optical alignment with said system; a focusing plate in a wall of said housing; means for holding a sensitized element in close proximity to a wall adjacent to said plate; a reflector; rotatable means mounted for movement about a fixed axis laterally displaced from the plane of said plate and intermediate said holding means and said last-named wall; means circumscribing a marginal portion of said holding means interconnecting said rotatable means and said reflector whereby said reflector is pivotally movable about the axis of said rotatable means between alternate positions within said housing.

10. A camera comprising a lens system; a housing mounted in optical alignment with said system; a focusing plate in a wall of said housing; means for holding a sensitized element in close proximity to a wall adjacent to said plate; a reflector; a pivot disposed between said holding means and said last-named wall; and means for connecting said reflector to said pivot, the axis of said pivot being fixed relative to said housing and laterally displaced from the plane of said reflector in all positions of said reflector, said connecting means comprising an arm having a laterally deflected end portion extending about at least two adjacent surfaces of said holding means.

11. A camera comprising a lens system; a housing mounted in optical alignment with said system; a focusing plate mounted in a wall of said housing; an element having a light sensitive surface mounted adjacent another wall of said housing with the light sensitive surface thereof facing said lens system; a reflector; and means for mounting said reflector within said housing for pivotal movement about an axis fixed relative to said housing and disposed on the side of said element facing said last-named wall, said axis extending substantially parallel with said light sensitive surface and displaced laterally from the plane of said reflector, said reflector being movable from a position wherein it angularly extends across the optical axis of said lens system to reflect onto said plate the image formed by said lens system to one wherein it is substantially parallel with said plate.

12. A camera comprising a lens system; a housing mounted in optical alignment with said system; a reflector; a focusing plate; a sensitized element having a light sensitive surface; means for holding said element in a plane intercepting the optical axis of said system and extending substantially normal to said plate with the sensitive surface thereof facing said lens system; and means for mounting said reflector within said housing for pivotal movement about an axis fixed relative to said housing and disposed adjacent the surface of said element opposite the light sensitive surface thereof, said reflector being movable from a positon wherein it angularly extends across the optical axis of said system to reflect onto said plate the image formed by said system to a position wherein it extends substantially parallel with said plate.

13. A camera comprising a lens system; a housing mounted in optical alignment with said system; means for holding a sensitized element in a plane intercepting the optical axis of said system; a reflector; and means for mounting said reflector for pivotal movement within said housing, said means comprising pivot means having a pivotal axis fixed relative to said housing and displaced laterally from the plane of said reflector in all positons thereof and a substantially U-shaped supporting arm extnding about a marginal portion of said holding means and interconnecting the pivot means and said reflector, said reflector being movable between alternate positions relative to said housing, said reflector in one of said positions angularly extending across the optical path of said system and in the other of said positions lying without said path and substantially normal to said element.

EDWARD F. FLINT.
HENRY F. KURTZ.